(12) United States Patent
Hannah

(10) Patent No.: US 7,908,862 B2
(45) Date of Patent: Mar. 22, 2011

(54) GENERATOR

(75) Inventor: J. Nolan Hannah, Richmond, IN (US)

(73) Assignee: Thoupa Gen LLC, Richmond, IN (US)

( * ) Notice: Subject to any disclaimer, the term of this patent is extended or adjusted under 35 U.S.C. 154(b) by 0 days.

(21) Appl. No.: 12/115,984

(22) Filed: May 6, 2008

(65) Prior Publication Data
US 2009/0277174 A1 Nov. 12, 2009

(51) Int. Cl.
F01K 27/00 (2006.01)
F01K 13/00 (2006.01)
F01K 23/06 (2006.01)

(52) U.S. Cl. ............................. 60/670; 60/643; 60/645

(58) Field of Classification Search ............. 60/643–684
See application file for complete search history.

(56) References Cited

U.S. PATENT DOCUMENTS

| | | | |
|---|---|---|---|
| 2,924,203 A * | 2/1960 | Loebel | 122/149 |
| 3,258,402 A | 6/1966 | Farnsworth | |
| 3,386,883 A | 6/1968 | Farnsworth | |
| 3,495,406 A * | 2/1970 | Donatelli et al. | 60/227 |
| 3,530,497 A | 9/1970 | Hirsch et al. | |
| 3,732,692 A * | 5/1973 | Norell | 60/661 |
| 4,138,847 A | 2/1979 | Hill | |
| 4,519,206 A | 5/1985 | van Michaels | |
| 4,697,424 A * | 10/1987 | Dickerson et al. | 60/670 |
| 5,160,695 A | 11/1992 | Bussard | |
| 5,186,001 A * | 2/1993 | Muntz et al. | 60/515 |
| 5,542,247 A * | 8/1996 | Bushman | 60/203.1 |
| 6,000,223 A * | 12/1999 | Meyer | 60/643 |
| 6,024,935 A | 2/2000 | Mills et al. | |
| 7,019,412 B2 | 3/2006 | Ruggieri et al. | |
| 2003/0082060 A1 | 5/2003 | Kono | |
| 2003/0145593 A1 | 8/2003 | Goldenblum | |
| 2004/0247522 A1 | 12/2004 | Mills | |
| 2006/0257089 A1 | 11/2006 | Mueth et al. | |

OTHER PUBLICATIONS

International Searching Authority, International Search Report, article, May 17, 2010, 3 pages, European Patent Office.
International Searching Authority, Written Opinion of the International Searching Authority, article, May 17, 2010, 5 pages, European Patent Office.
International Searching Authority, Notification of Transmittal of the International Search Report and the Written Opinion of the International Searching Authority, or the Declaration, article, May 17, 2010, 3 pages, European Patent Office.

* cited by examiner

Primary Examiner — Thomas E Denion
Assistant Examiner — Christopher Jetton
(74) Attorney, Agent, or Firm — D'Hue Law LLC; Cedric D'Hue

(57) ABSTRACT

A generator is disclosed. The generator comprising at least one layer, the at least one layer defining a cavity and at least one aperture, at least a portion of the at least one layer including a reflective medium, or coatings, the cavity configured to hold a fluid, a fluid inlet coupled to the at least one layer, the fluid inlet in fluid communication with the cavity, and a fluid outlet coupled to the at least one layer, the fluid outlet in fluid communication with the cavity, the fluid configured to absorb radiation, the fluid outlet configured to release the fluid to perform work.

19 Claims, 14 Drawing Sheets

GENERATOR

BACKGROUND

Most electricity is generated at a power station by a process in which heat is used to convert water to steam. The steam expands through a turbine device causing it to rotate. This powers a generator unit, which produces electricity. The heat is provided by burning a fuel such as coal, oil, gas, or wood, or from nuclear, solar or geothermal energy. On a smaller scale, the generator unit may be powered by an internal combustion engine, such as a diesel or petrol driven motor. Similarly, the alternator used with the internal combustion engine in every type of automobile for providing electricity to the vehicle is powered by the rotating drive shaft of the engine.

All these devices use moving parts which are subject to friction and wear, and only a percentage of the heat generated is converted into electricity.

SUMMARY

The present disclosure includes a generator including at least one layer, the at least one layer defining a cavity and at least one aperture, at least a portion of the at least one layer including a reflective medium, the cavity configured to hold a fluid, a fluid inlet coupled to the at least one layer, the fluid inlet in fluid communication with the cavity, and a fluid outlet coupled to the at least one layer, the fluid outlet in fluid communication with the cavity, the fluid configured to absorb radiation, the fluid outlet configured to release the fluid to perform work.

The present disclosure also includes a method of providing work including the steps of: introducing fluid into a cavity, wherein at least one layer defines the cavity, the at least one layer configured to withstand greater than atmospheric pressure, the at least one layer including a reflective medium, or coatings, concentric to the interior surface of the at least one layer, directing radiation into the cavity, the radiation absorbable by the fluid, releasing the radiated fluid to do work.

The present disclosure also includes a generator including at least one layer, the at least one layer defining a cavity, at least a portion of the at least one layer including a reflective medium, or coatings, the cavity configured to hold a fluid, the at least one layer defining at least one aperture, a boson pumping system coupled to the at least one layer, the boson pumping system including a boson pumping device, the boson pumping system including a boson passage configured to operably couple radiation from the boson pumping device to the cavity, at least one observation tube adjacent to the at least one aperture, the at least one observation tube coupled to a detector for detecting or monitoring within the cavity, at least one spinner system at least partially located within the cavity, the at least one spinner system configured to impart a spinning motion on the fluid, a fluid inlet coupled to the at least one layer, the fluid inlet in fluid communication with the cavity, and a fluid outlet coupled to the at least one layer, the fluid outlet in fluid communication with the cavity, the fluid configured to absorb radiation in the cavity, the fluid outlet configured to release the fluid to perform work

BRIEF DESCRIPTION OF THE DRAWINGS

The above-mentioned and other features of this invention, and the manner of attaining them, will become more apparent and the invention itself will be better understood by reference to the following description of embodiments of the invention taken in conjunction with the accompanying drawings, wherein.

Figure 1:
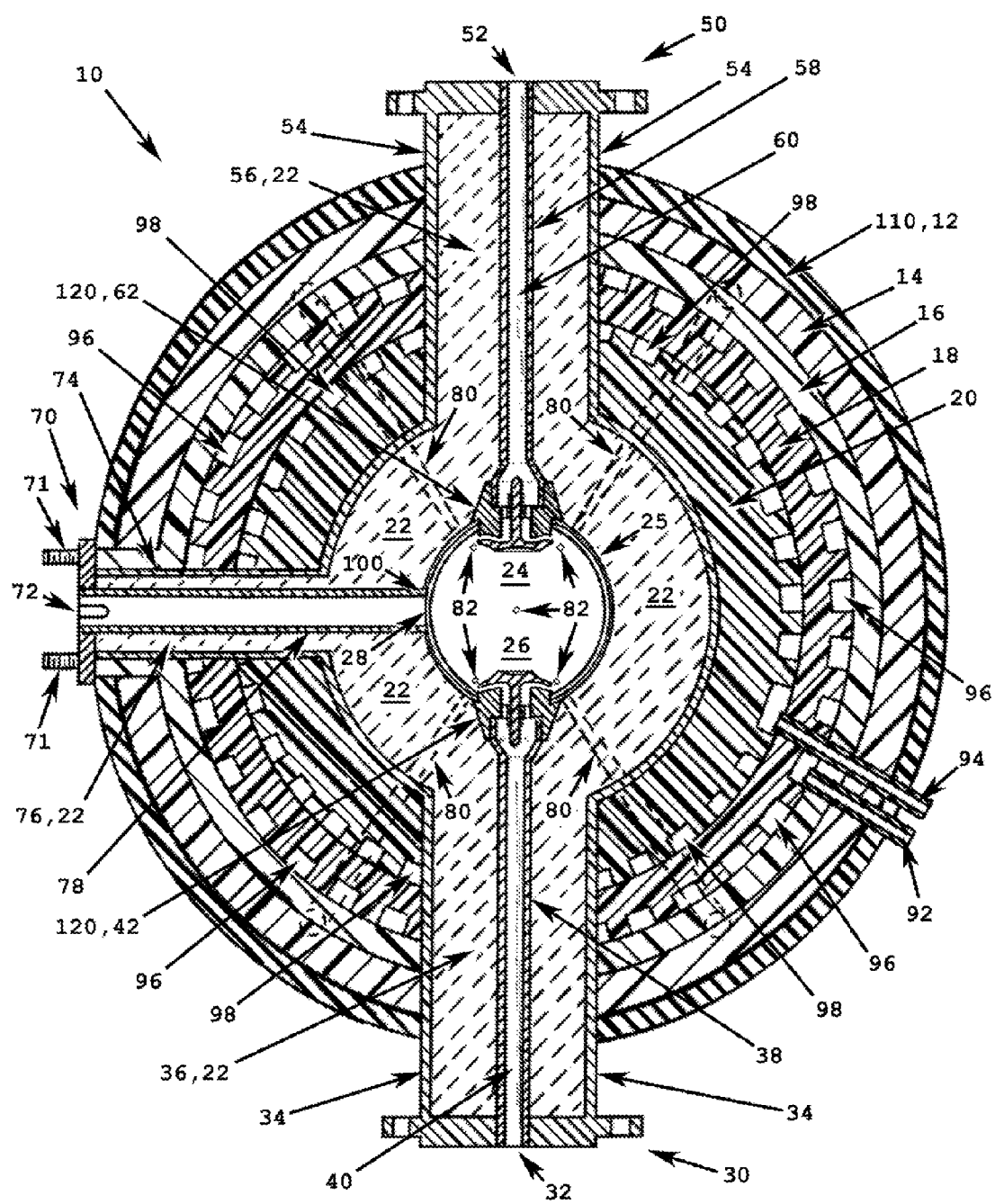
FIG. 1 is a cross sectional view of a THOUPA generator.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF THE PREFERRED EMBODIMENTS

The embodiments disclosed below are not intended to be exhaustive or limit the invention to the precise forms disclosed in the following detailed description. Rather, the embodiments are chosen and described so that others skilled in the art may utilize their teachings.

As shown in FIG. 1, a cross-sectional view of the THOUPA generator 10 is illustrated. THOUPA stands for T-thermal H-heat O-operated U-under P-pressure A-accumulator. THOUPA 10 may be constructed of a pattern of layers 12, 14, 16, 18, 20 and 22. Layers 12, 14, 16, 18, 20, and 22 may define an substantially spherical shape. It is understood that layers 12, 14, 16, 18, 20 and 22 may have any combination of composite materials for reinforcement. Layers 12, 14, 16, 18, 20 and 22 may comprise materials such as reinforced ceramics, clays, papier-mache, paperclay (also known as fiberclay), concretes, stone, refractory materials, glass or other Bose Particle (also described throughout as boson, bosons, or boson particle) transparent medium, cements, powdered or liquid resins, plastics, coatings, epoxies, rubber, any harden heat resistant material that has a low and slow rate of heat absorption and thermal conductivity, and other like insulating materials. Layer 22 may comprise reinforced materials that will insulate and isolate the heat transfer and/or thermal conduction moving out from cavity 24. Layers 12, 14, 16, 18, 20 and 22 may be reinforced by manmade fibers including fiberglass, aramid fiber such as Kevlar®, graphite, carbon, and metal fibers. It is understood that layers 12, 14, 16, 18, 20 and 22 can be comprised of recycled used materials such as rubber, plastics, paper, glass and/or ceramics. The layers 12, 14, 16, 18, 20 and 22 are concentric. Combined, the layers may have a spherical form. Most interior layer 22 defines a cavity 24. Cavity 24 may be substantially spherical. Most interior layer 22 may also include cavity wall 25 which is discussed in more detail below.

Layers 12, 14, 16, 18, 20 and 22 may provide vacuum barrier layers to minimize heat transfer by conduction and convection out of cavity 24 through layers 12, 14, 16, 18, 20 and 22. Also illustrated in FIG. 1, built in standoffs, also known as Evacuation tubes 92 and 94 provide air passage to layers 18 and 20, respectively. Layers 16 and 18 define cavities 96, and layers 18 and 20 define cavities 98. Evacuation tube 92 is in fluid communication with cavities 96. Evacuation tube 94 is in fluid communication with cavities 98.

Evacuation tubes 92 and 94 may be used to independently place cavities 96 and 98 into vacuum. Cavity 96 at vacuum effectively creates a vacuum barrier layer between layers 16 and 18. Cavity 98 at vacuum effectively creates a vacuum barrier layer between layers 18 and 20. Vacuum barrier layers minimize heat transfer by convection. As discussed in greater detail below THOUPA 10 also includes mechanisms to minimize and reduce surface contact between layers in the vacuum barrier area reducing thermal conductivity and heat transfer. By using standoffs 92 and 94 may create vacuum cavities to reduce convection between layers. Standoffs 92 and 94 provide air passage so a vacuum can be pulled in the region.

Standoffs 92 and 94 between adjacent layers also aid in maintaining structural strength between layers 12, 14, 16, 18 and 20. Standoffs 92 and 94 between adjacent layers also aid in reducing surface contact between layers 12, 14, 16, 18 and 20, minimizing heat transfer by conduction. Standoffs 92 and 94 between adjacent layers may take a number of different shapes. Standoffs 92 and 94 may depend on the hardness of the adjacent layers that create the vacuum. The shape of the standoffs 92 and 94 can be similar to a dowel, a sphere, a half shape, or honey comb including cells. Standoffs 92 and 94 may have air passages between cells so that the vacuum can be pulled of each cell of the honey comb structure. As the pressure load builds in the internal layers there should be even pressure distribution to each adjacent layer throughout generator 10. In this embodiment, the vacuum may provide a reduce surface area in direct contact between layers 12, 14, 16, 18 and 20. There may be a plurality of standoffs 92 and 94. Standoffs 92 and 94 may be placed around layers 12, 14, 16, 18, and 20 to evenly distribute pressure load between each adjacent layer.

THOUPA 10 also includes fluid conduits 30 and 50. Fluid inlet conduit 30 includes inlet 32, walls 34, layer 36, fluid inlet walls 38, fluid inlet passage 40 and fluid inlet spinner 42. Walls 34, 54, and 74 are illustrated as integral parts of a single structure. Walls 34, 54, and 74 may comprise separate structures. Layers 22, 36, 56, and 76 are illustrated as integral parts of a single structure. Layers 22, 36, 56, and 76 may comprise separate structures. Layers 36, 56, and 76 may comprise the same materials as previously described for layer 22.

As described in more detail below, fluid inlet 30 provides fluid 106 (FIG. 9) to cavity 24 through inlet 32. Fluid output conduit 50 includes outlet 52, walls 54, layer 56, fluid outlet walls 58, fluid outlet passage 60 and fluid outlet spinner 62. Similar to fluid inlet 30, fluid output conduit 50 allows fluid to exit cavity 24 through outlet 52. Fluid inlet spinner 42 and fluid outlet spinner 62 will be discussed in greater detail below.

Figure 13:
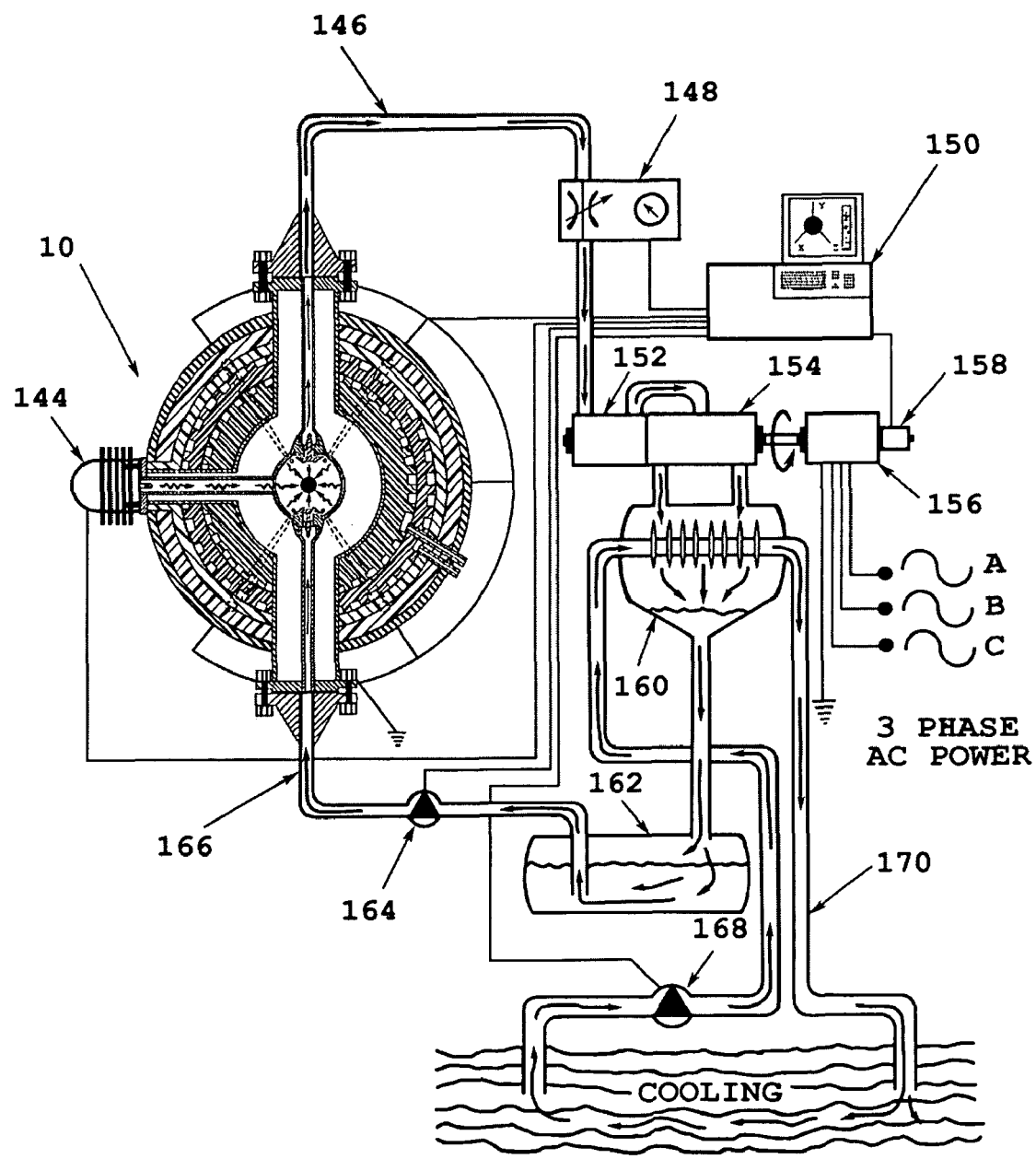
FIG. 13 is a cross sectional view of the THOUPA generator of FIG. 1 for use with an electrical generator system.

THOUPA 10 further includes Bose Particle pumping system 70 which is capable of working with a Bose Particle pumping device 144 (FIG. 13). Bose Particle pumping system 70 includes opening 72, Bose Particle pumping wall 74, Bose Particle pumping layer 76, and Bose Particle passage 78. Bose Particle pumping system 70 may also include fasteners 71 to couple Bose Particle pumping system 70 to Bose Particle pumping device 144 (FIG. 13). Opening 72 is adjacent to Bose Particle passage 78. Bose Particle passage 78 extends from the exterior surface of layer 12 to at least the exterior surface of cavity wall 25. Particle passage 78 may comprise of fiber optics, light pipe, coaxial cable, waveguide, or any other electromagnetic transferring medium. Bose Particle passage 78 functions as a light pipe, waveguide, or any other electromagnetic transferring medium, such as fiber optics, or coaxial cable.

Cavity 24 may include a partially metallic mirrored surface by coating the exterior surface of glass or other Bose Particle transparent medium such as optional optical window 28 (FIG. 1). The glass or Bose Particle transparent medium may be used in the region of the Optical window 28 and also at each location of windows 82 and observation tubes 80. The coating may be a thin film coating so that Bose Particles of a wide range of wavelengths can pass freely. The coatings are optional configurations which are configured to will allow free boson transfer in and out of cavity 24 only in the regions of optical window 28, windows 82, and at observation tubes 80. Bose Particles may have nominal obstructions such as the index of refraction of the transparent material as part of cavity 24 structure and observation tubes 80. Other areas of cavity 24 that do not include Bose Particle transparent medium may include reflective coating. Reflective coating may cover the major interior surface 26 of cavity wall 25. Cavity wall 25 may have a reflective layer 26 configured to reflect Bose Particles. Reflective layer 26 is optionally configured to reflect Bose Particles back onto cavity 24 with some regions/areas of clear, transparent material or thin film coatings such as optical window 28 or windows 82.

Figure 9:
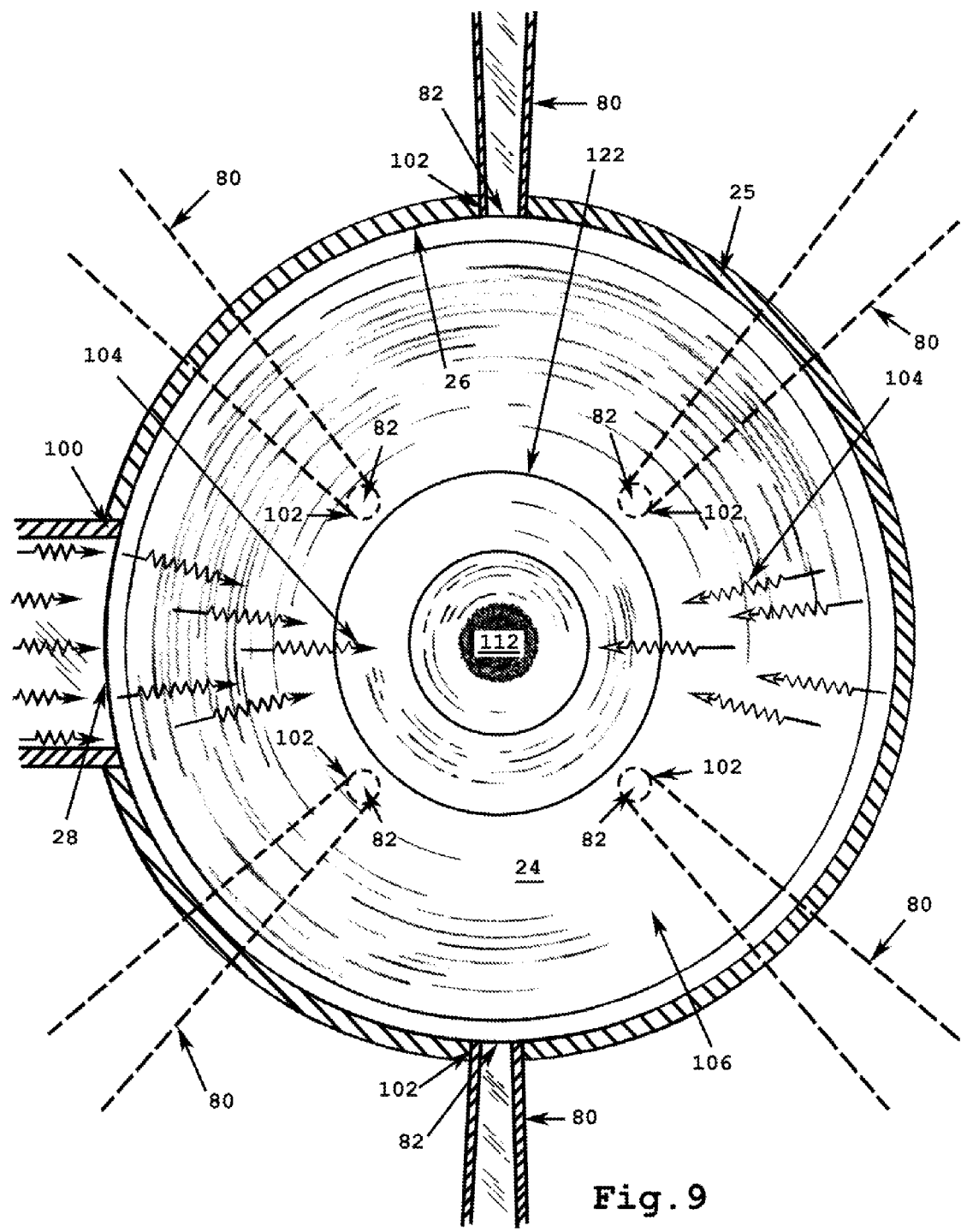
FIG. 9 is a cross sectional view of the THOUPA generator of FIG. 1.

Bose Particle pumping device 144 (FIG. 13) may include a semiconductor, a laser, a gas-filled or evacuated electron tube or any other device that can project a Bose Particle stream 104 (FIG. 9). Bose Particle pumping device 144 (FIG. 13) may be coupled to Bose Particle pumping system 70. Bose Particle pumping device 144 (FIG. 13) delivers Bose Particle stream 104 (FIG. 9) through opening 72. Similar to Bose Particle passage 78, opening 72 may open into fiber optics, light pipe, coaxial cable, waveguide, or any other electromagnetic transferring medium.

Observation tubes 80 are also illustrated in FIG. 1. Observation tubes 80 include windows 82 positioned adjacent to surface 26. Observation tubes 80 extend through layers 12, 14, 16, 18, 20 and 22 to the exterior surface of the THOUPA generator 10. Operation of observation tubes 80 will be discussed in greater detail below.

Figure 2:
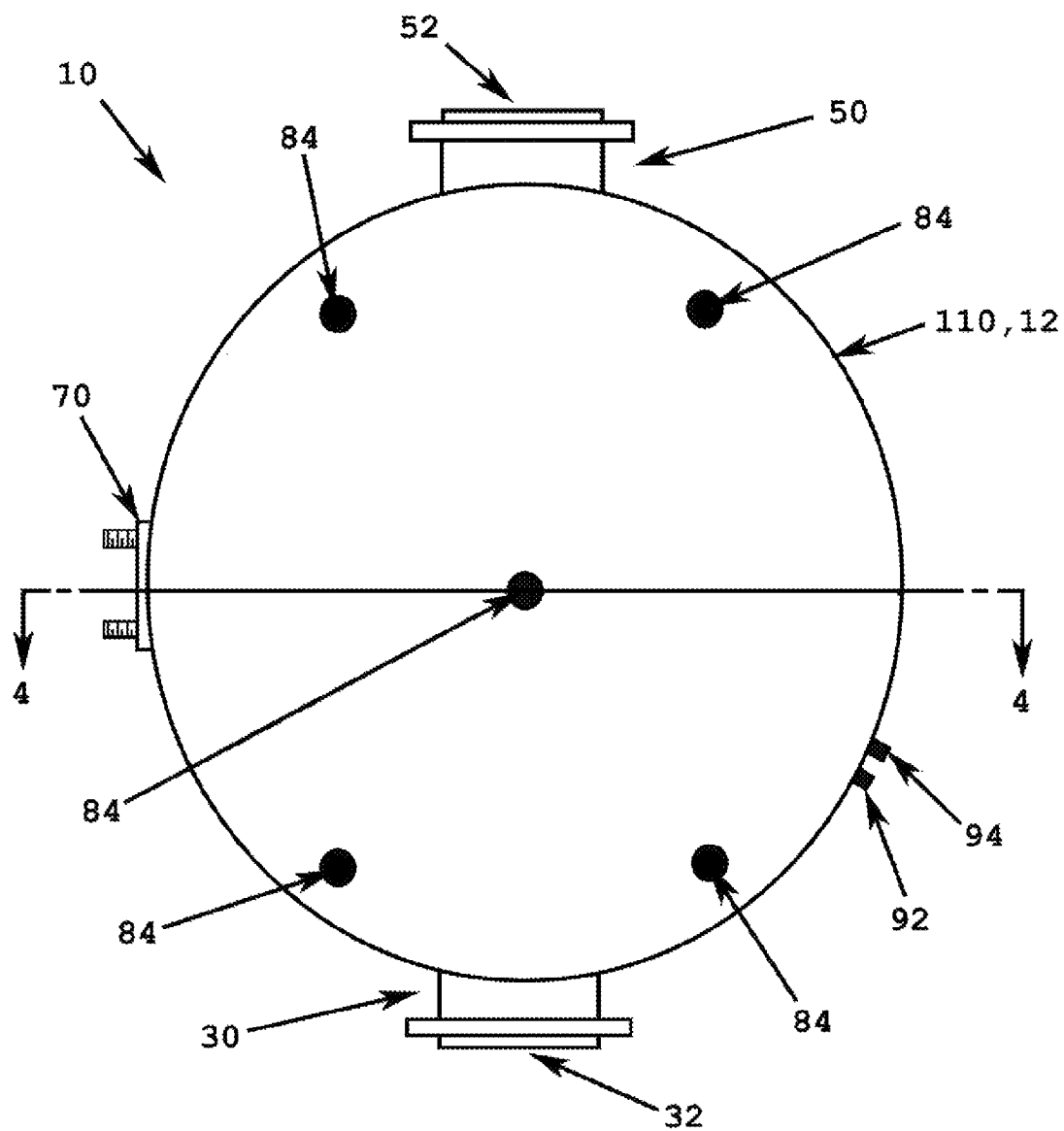
FIG. 2 is a perspective view of the THOUPA generator of FIG. 1.

As shown in FIG. 2, the perspective view of the THOUPA generator 10 is illustrated. The external surface 110 of layer 12 is shown. Also shown in FIG. 2, the external windows 84 of observation tubes 80 (FIG. 1). The purpose and function of observation tubes 80, especially external windows 84 as well as internal windows 82, will be discussed in greater detail below.

Figure 3:
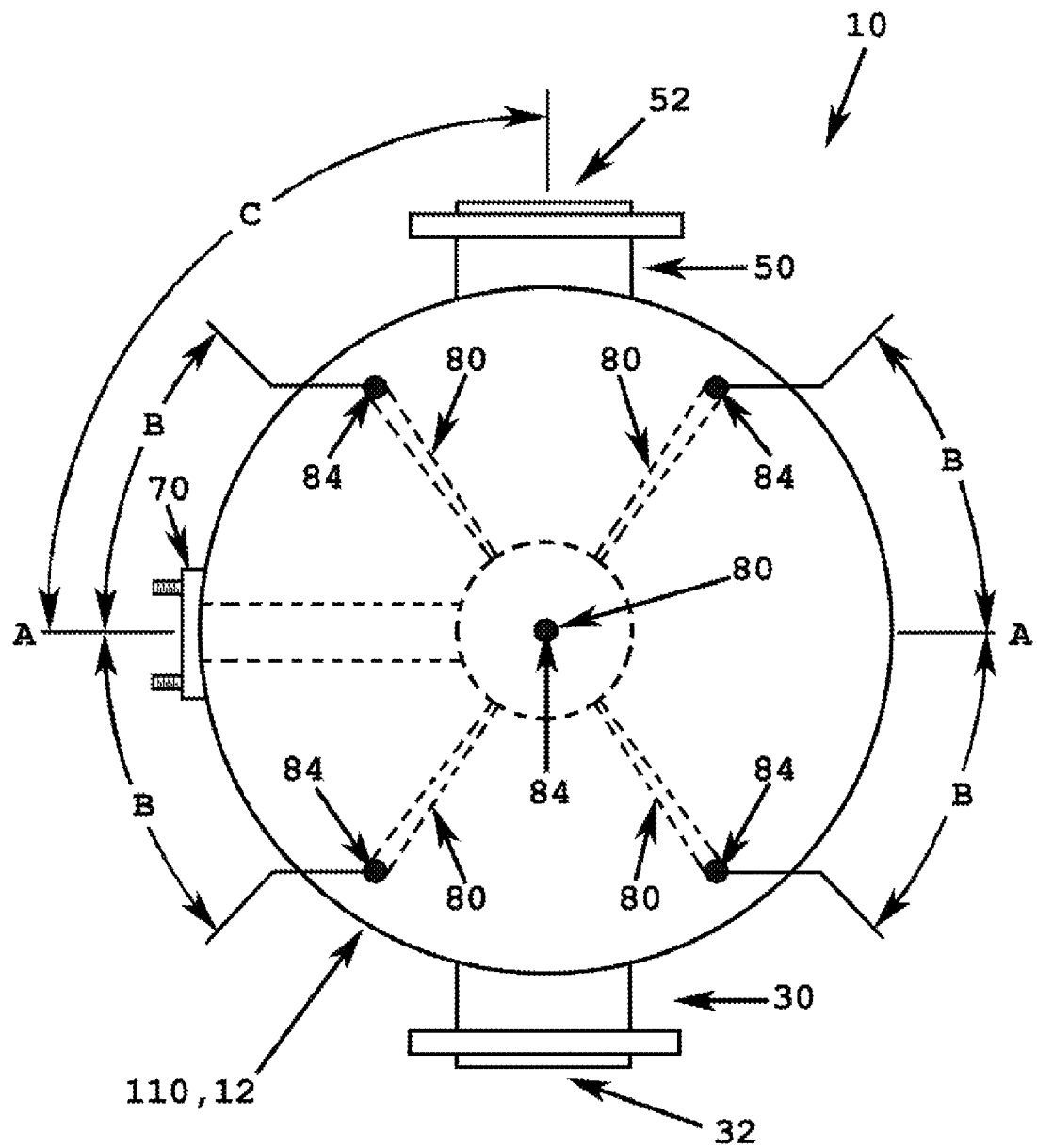
FIG. 3 is a perspective view of the THOUPA generator of FIG. 1.

As shown in FIG. 3, the placement and orientation of observation tubes 80 is disclosed in greater detail. Bose Particle stream 104 (FIG. 9) is illustrated as located along line A. Still referring to FIG. 3, notice that observation tubes 80 allow observation along paths that intersect line A; observation tubes 80 are not illustrated to lie along one plane. Also notice that observation tubes 80 are not illustrated to lie along line A. Some observation tubes 80 are oriented at angle B in relation to line A. As illustrated angle B is an angle of substantially 45 degrees. Angle B may be other angles. Some observation tubes 80 are not oriented at angle B but are oriented substantially perpendicular to line A. Fluid conduits 30 and 50 are oriented at angle C in relation to line A. Angle C may be an angle of substantially 90 degrees in relation to line A. Angle C may be other angles. Angles B and C are oriented to not detect radiation along line A. Observation tubes 80 may be oriented at any angle to detect or monitor radiation released tangential to line A.

Figure 4:
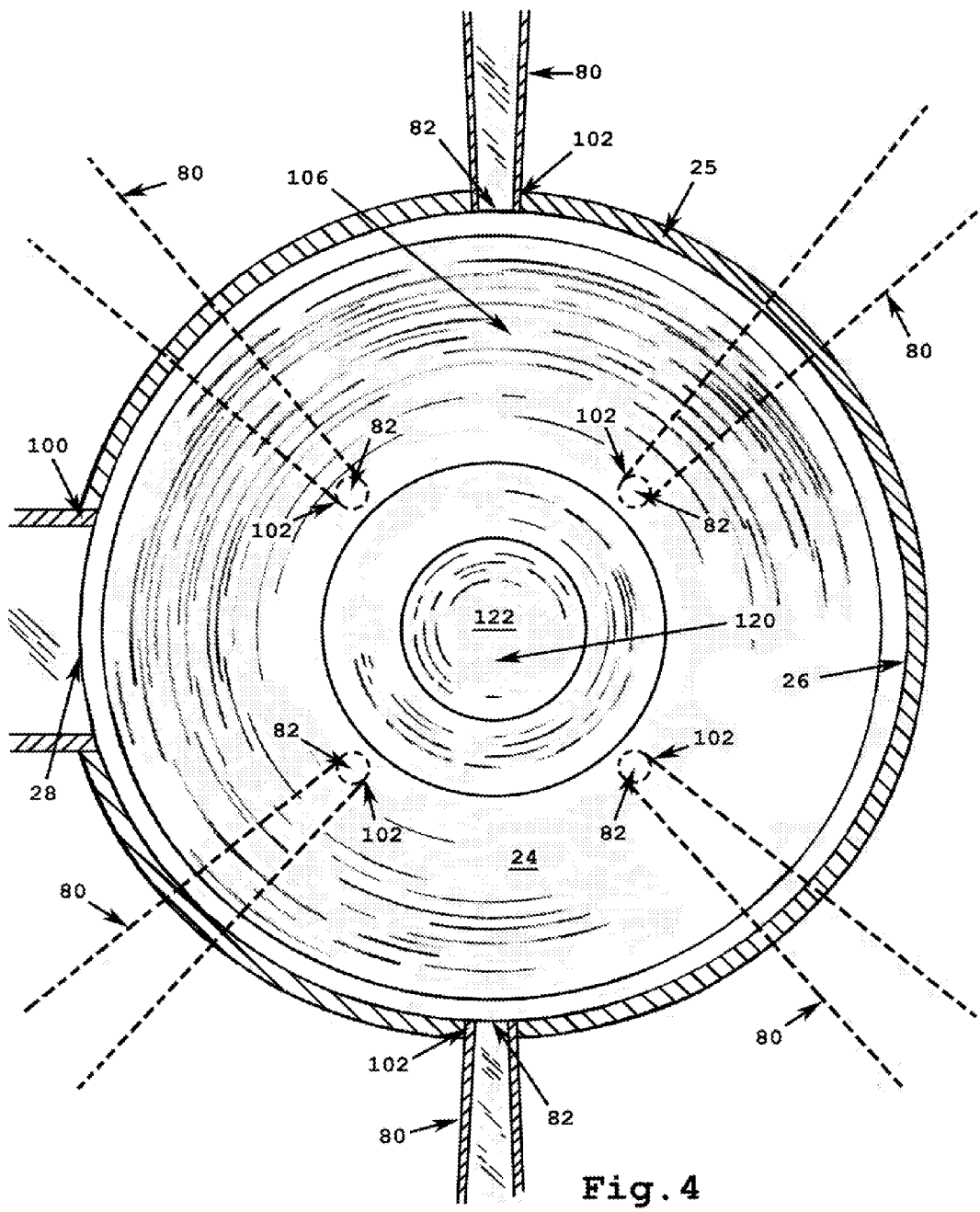
FIG. 4 is a cross section view of the THOUPA generator of FIG. 2.

As shown in FIG. 4, cavity 24 is shown in greater detail. Cavity 24 is capable of containing fluid 106 (FIG. 9). Cavity wall 25 may be metallic or comprised of any of the materials for layers 12-22. Cavity wall 25, in whole or in part, may also comprise optically reflective medium and/or metallic coatings. Cavity wall 25 may include an interior surface 26. Interior surface 26 may also comprise a reflective material, or coatings, such as an optical mirror or mirrored material.

Cavity wall 25 may define several apertures. Cavity wall 25 may define radiation aperture 100 to allow radiation to enter cavity 24. Radiation aperture 100 may be a coated surface of cavity wall 25. Optionally, radiation aperture 100 may include an optical window 28 (FIG. 1). Optical window 28 (FIG. 1) may be a one-way mirror, or coatings, also known as half-silvered, similar to one-way mirrors used in lasers. Optical window 28 may be configured to allow radiation to enter cavity 24 and to keep at least a portion of the radiation within cavity 24 by reflection. Cavity wall 25 may define apertures 102 to include windows 82 for observation tubes 80. Windows 82 may also comprise the same material as optical window 28. Windows 82 may be glass or coatings of the Bose Particle transparent medium. Such coatings may also comprise the exterior surface of optical window 28 and observation tubes 80.

Figure 5:
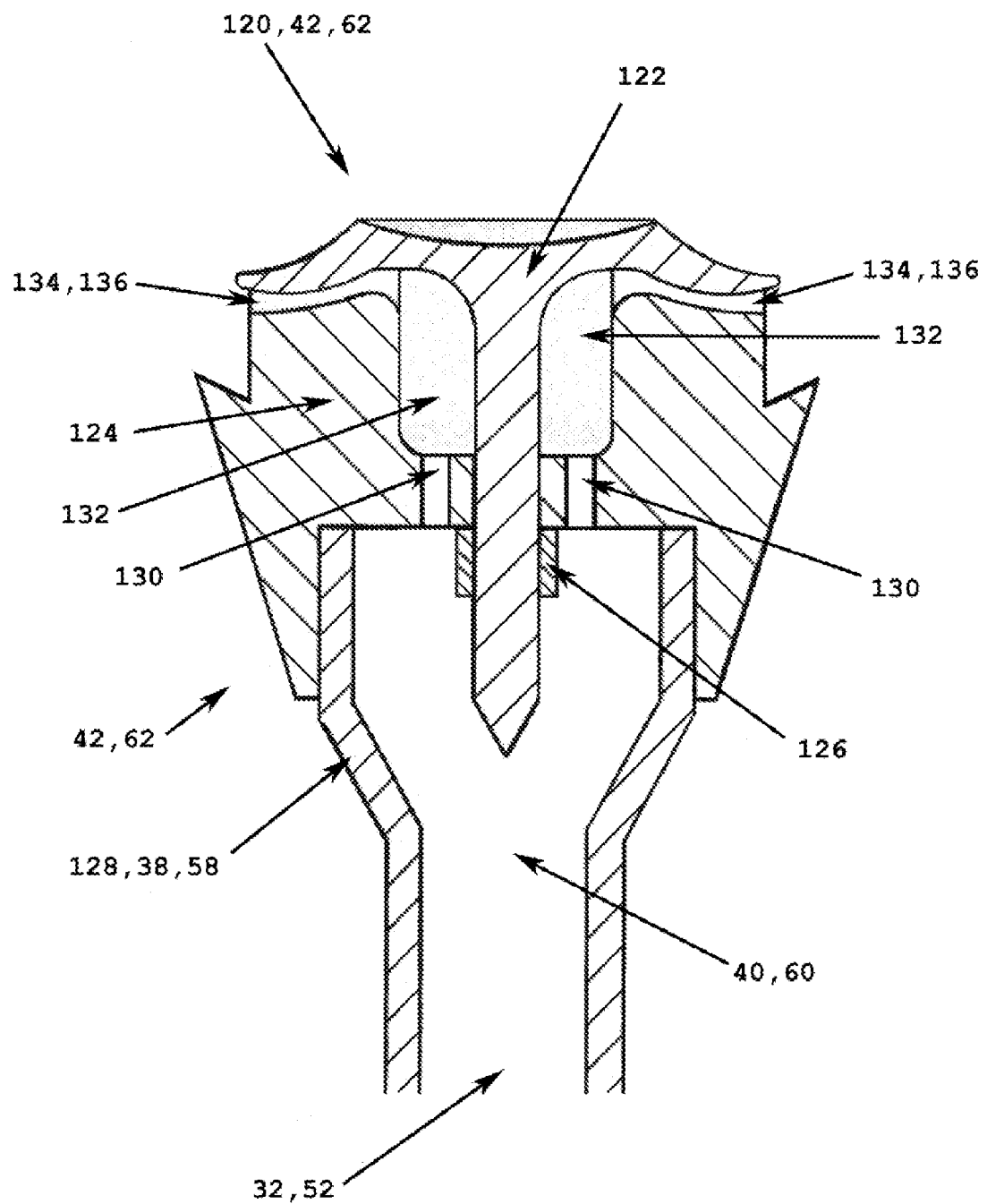
FIG. 5 is a cross section view of the spinner cap of the THOUPA generator of FIG. 1.

As shown in FIG. 4, spinner system 120 is generally shown. Spinner system 120 may correspond to or be a part of either fluid inlet spinner 42 (FIG. 1) or fluid outlet spinner 62 (FIG. 1). As shown in FIG. 5, spinner system 120 is shown in greater detail including spinner cap 122, spinner body 124, spinner cap retaining member 126 and spinner portion 128 of either fluid inlet walls 38 (FIG. 1) or fluid outlet walls 58 (FIG. 1). As illustrated, spinner portions 128 are coupled to both fluid inlet passage 40 (FIG. 1) or fluid outlet passage 60 (FIG. 1) to spinner body 124. As illustrated, spinner body 124 defines spinner body passageways 130 and spinner body cavity 132. As illustrated, spinner body 124 and spinner cap 122 together define spinner ports 134. Spinner body passageways 130, spinner body cavity 132 and spinner body ports 134 provide fluid communication to cavity 24 from either fluid inlet passage 40 (FIG. 1) or fluid outlet passage 60 (FIG. 1). Spinner system 120 can be configured in several alternative configurations. As illustrated in FIG. 5, spinner body passageways 130 are substantially parallel to a longitudinal axis of spinner system 120.

Figure 6:
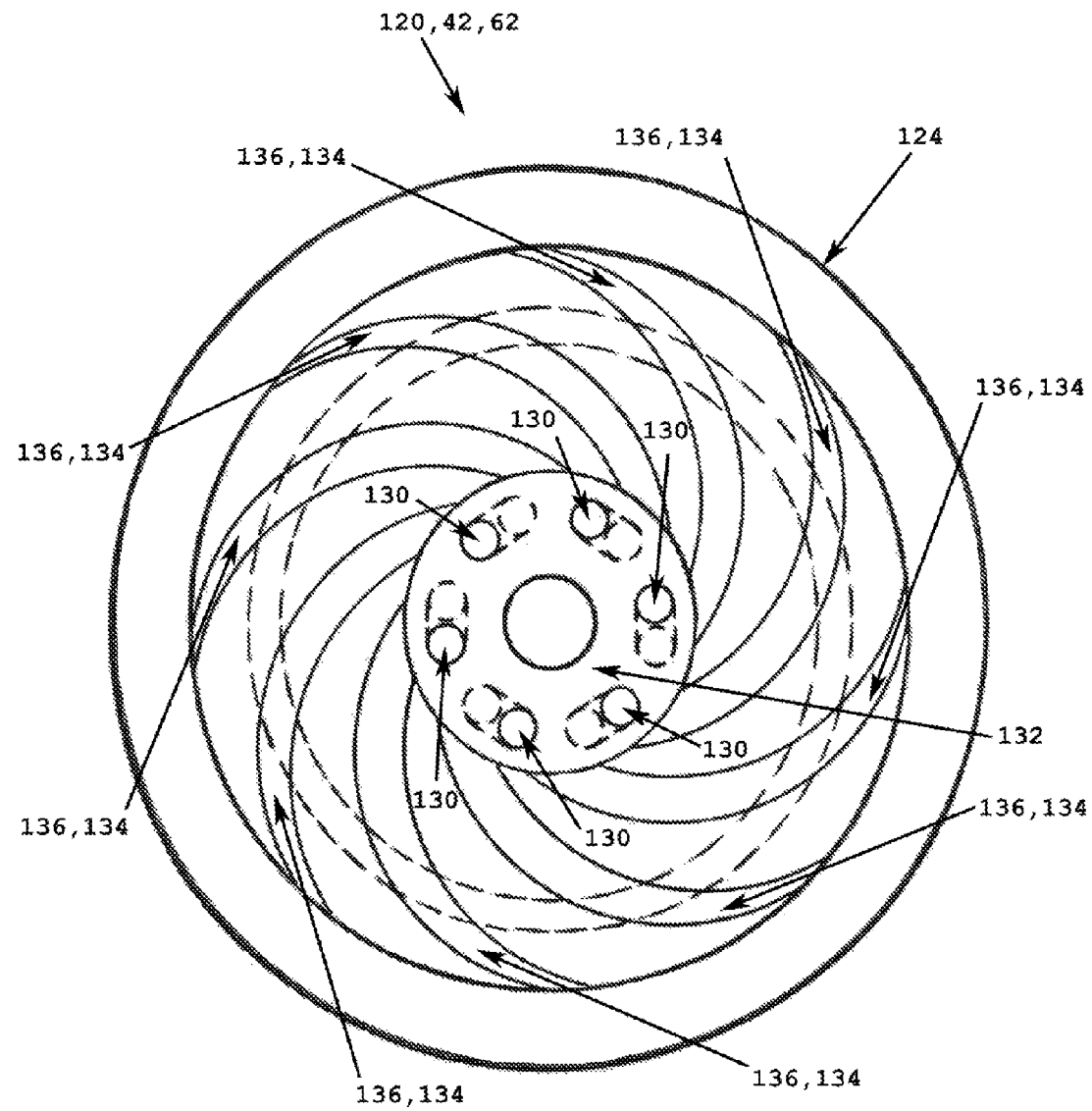
FIG. 6 is a top or bottom view of the spinner cap of the THOUPA generator of FIG. 1.

As shown in FIG. 6, the top side of spinner body 124 (or the bottom side of spinner cap 122 or both) defines curved groove channels 136. As fluid 106 (FIG. 9) passes through spinner ports 134 (FIG. 5), curved groove channels 136 impart a spinning motion on fluid 106 (FIG. 9) within cavity 24 (FIG. 1). Note that there are several ways to impart a spinning motion on fluid 106 (FIG. 9) within cavity 24 (FIG. 1), such as curved passageways within a single stationary structure. As illustrated in FIG. 6 and as a separate embodiment from the illustration in FIG. 5, spinner body passageways 130 are transverse to the longitudinal axis of spinner system 120. That spinner body passageway 130 is transverse is another way to impart a spinning motion on fluid 106 (FIG. 9) within cavity 24. Note that the illustration in FIG. 6 applies equally to fluid 106 (FIG. 9) inlet into cavity 24 as well as fluid 106 (FIG. 9) output out of cavity 24.

Figure 7:
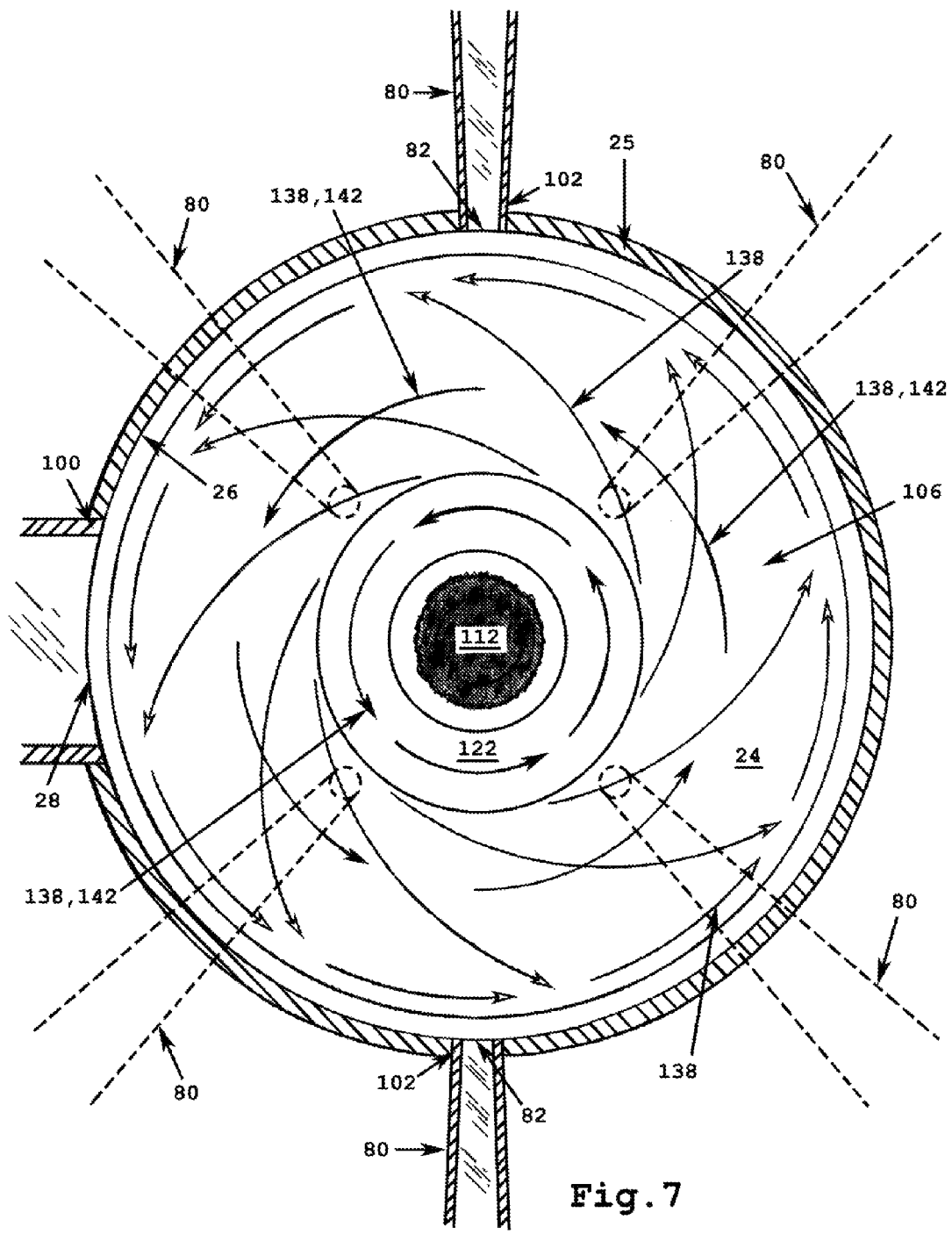
FIG. 7 is a cross sectional view of the THOUPA generator of FIG. 1.
Figure 8:
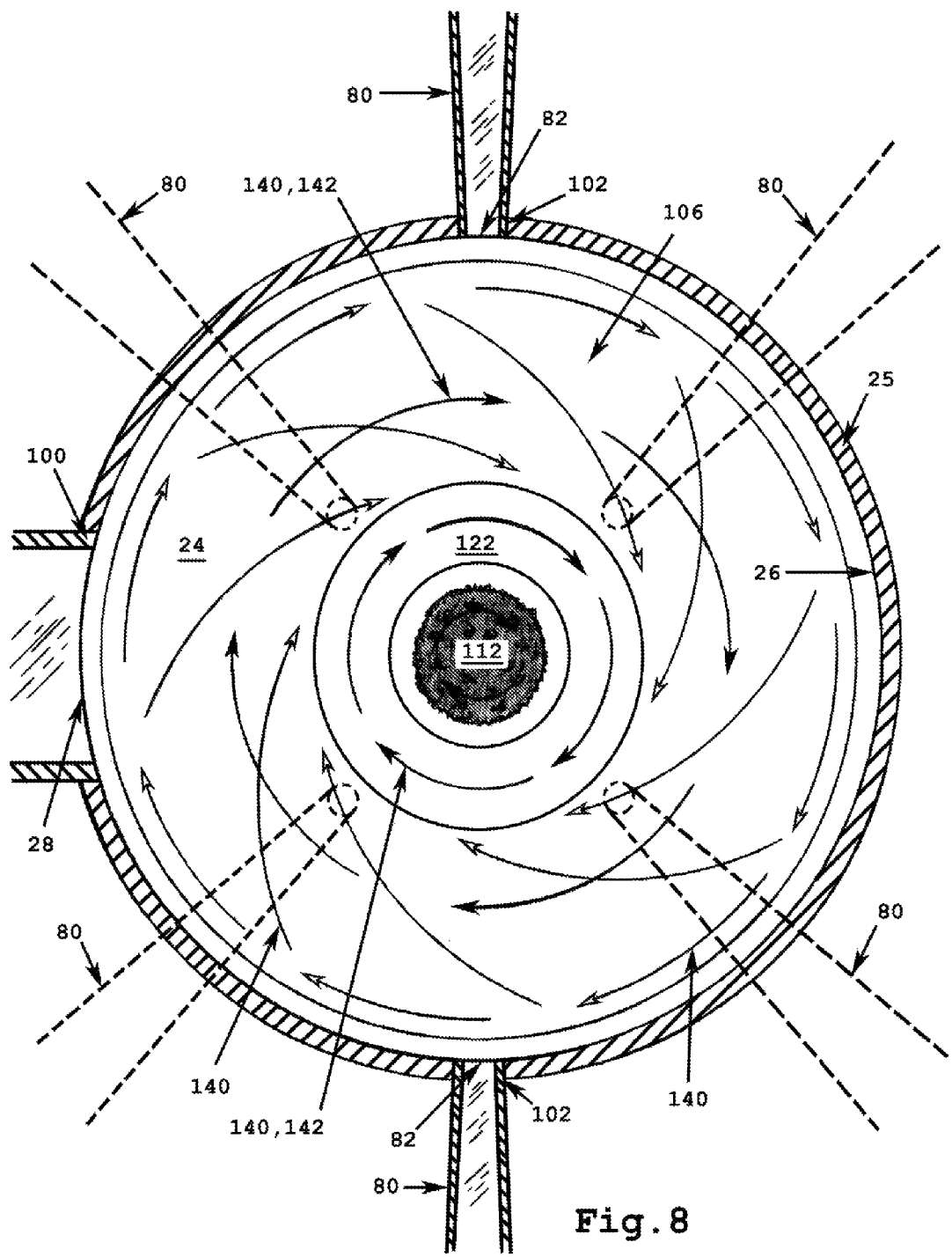
FIG. 8 is a cross sectional view of the THOUPA generator of FIG. 1.

Spinner system 120 can be arranged to impart a spinning motion on fluid 106 (FIG. 9) within cavity 24 whether associated with fluid inlet conduit 30 or fluid outlet conduit 50. FIG. 7 illustrates operation of spinner system 120 in association with fluid inlet conduit 30. In this illustration, rotation of spinner cap 122 imparts a spinning motion on fluid 106 as illustrated by lines 138. In an alternative embodiment, spinner cap 122 does not spin, curved groove channels 136 impart a spinning motion on fluid 106. FIG. 8 illustrates operation of spinner system 120 in association with fluid output conduit 50. In this illustration rotation of spinner cap 122 imparts a spinning motion on fluid 106 as illustrated by lines 140. Spinner cap 122 may impart a spinning motion on fluid 106, due to the angle of incident of fluid 106 passing through spinner ports 134 and the angle of the curved groove channels 136 (FIG. 6).

Figure 12:
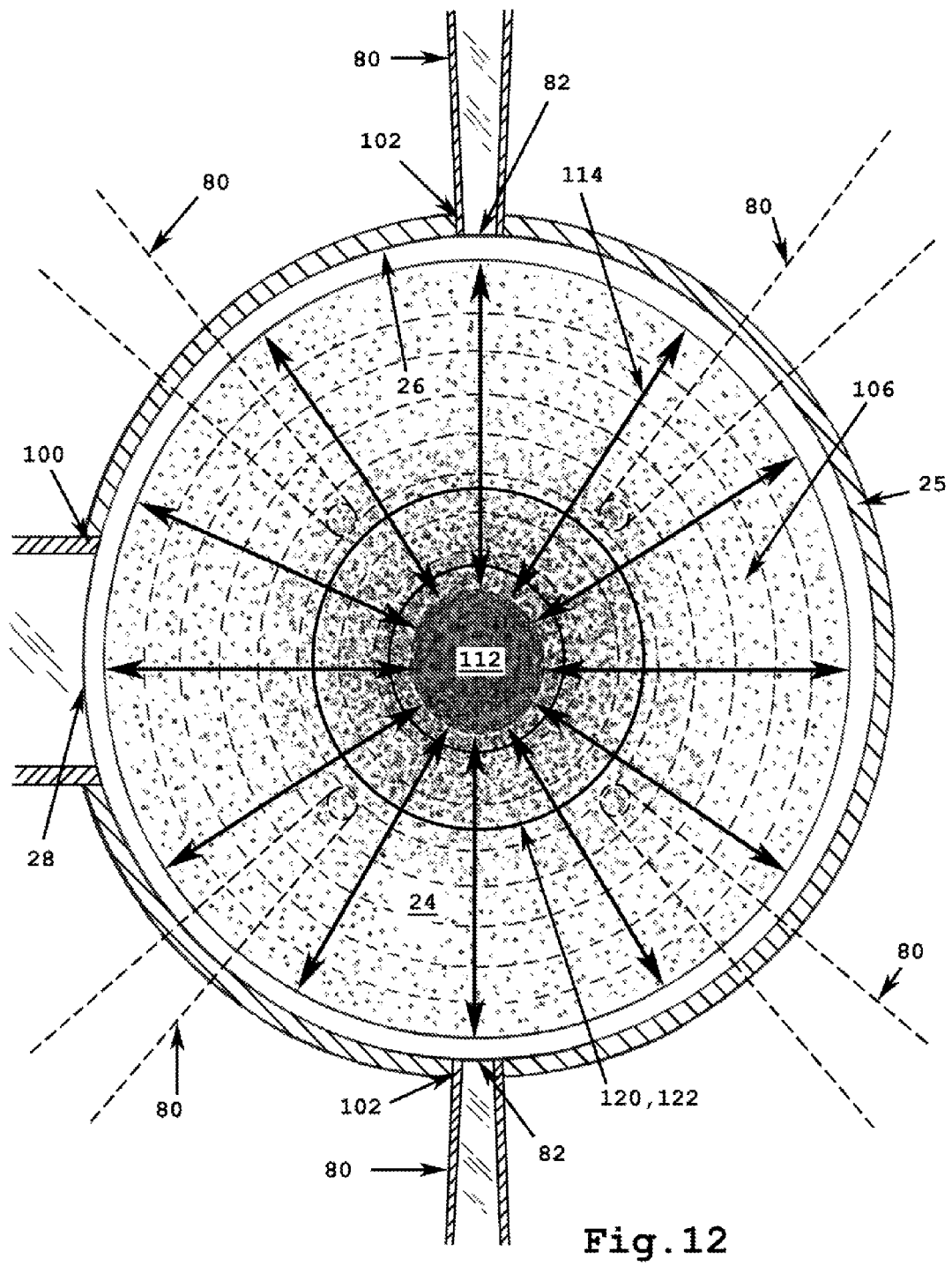
FIG. 12 is a cross sectional view of the THOUPA generator of FIG. 1.

In operation, as shown in FIG. 9, Bose Particle stream 104, as radiation, enters cavity 24. Cavity 24 is filled with fluid 106 supplied by fluid inlet 30 (FIG. 1) and removed by fluid outlet 50 (FIG. 1). Fluid 106 absorbs at least some of radiation 104. By absorption, the properties of fluid 106 may change to increase the amplitude, temperature, pressure or excitation level of the molecules comprising fluid 106. Increased amplitude, heat and excitation level is shown as fluid 112; increased pressure is shown by several radial arrows 114 (FIG. 12). Radiation 104 not initially absorbed by fluid 106 may reflect off of reflective interior surface 26. Reflected radiation 104 may have a greater chance of being absorbed by fluid 106. Increased pressure 114 restricts the volume of fluid 112 to expand, due to the physical resistance built within the multiple layers 12, 14, 16, 18, 20, and 22 of the THOUPA generator 10 illustrated in FIG. 1. Increased pressure 114 may add to increased amplitude, excitation level, temperature, superheating of fluid 112 by way of the incident/reflected concentrated radiation 104, plus hydraulic compression also illustrated as 114 (FIG. 12), and/or particle pinching of the superheated internal core region.

Figure 10:
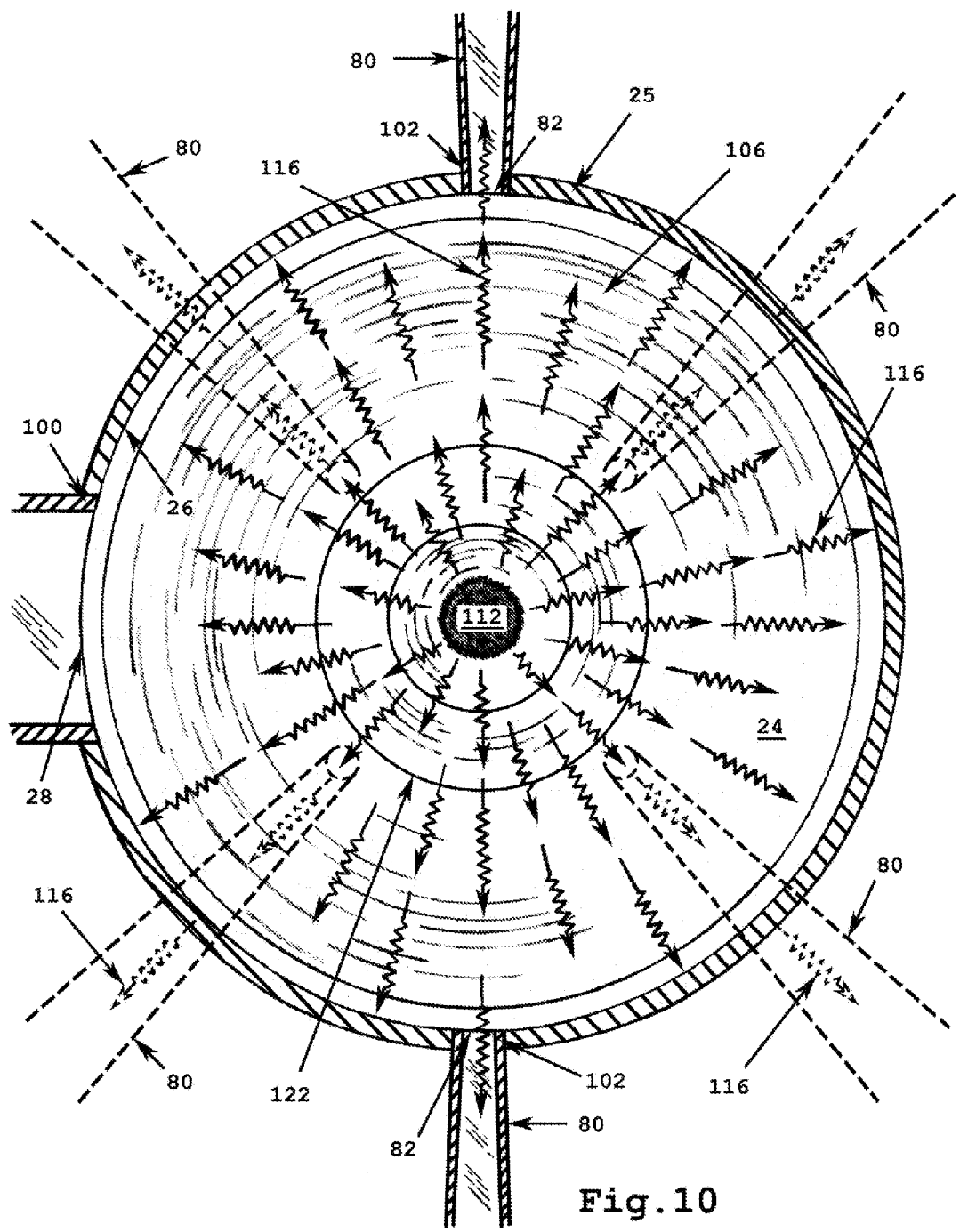
FIG. 10 is a cross sectional view of the THOUPA generator of FIG. 1.

In operation, as shown in FIG. 10, increased amplitude, heat and excitation fluid 112 may release Bose Particle energy 116. Some of released Bose Particle energy 116 may leave cavity 24 through windows 82 into observation tubes 80. Bose Particle energy 116 released through windows 82 into observation tubes 80 may be detected or monitored by any Bose Particle detection system (not shown), passing through external windows 84 illustrated in FIG. 2.

Figure 11:
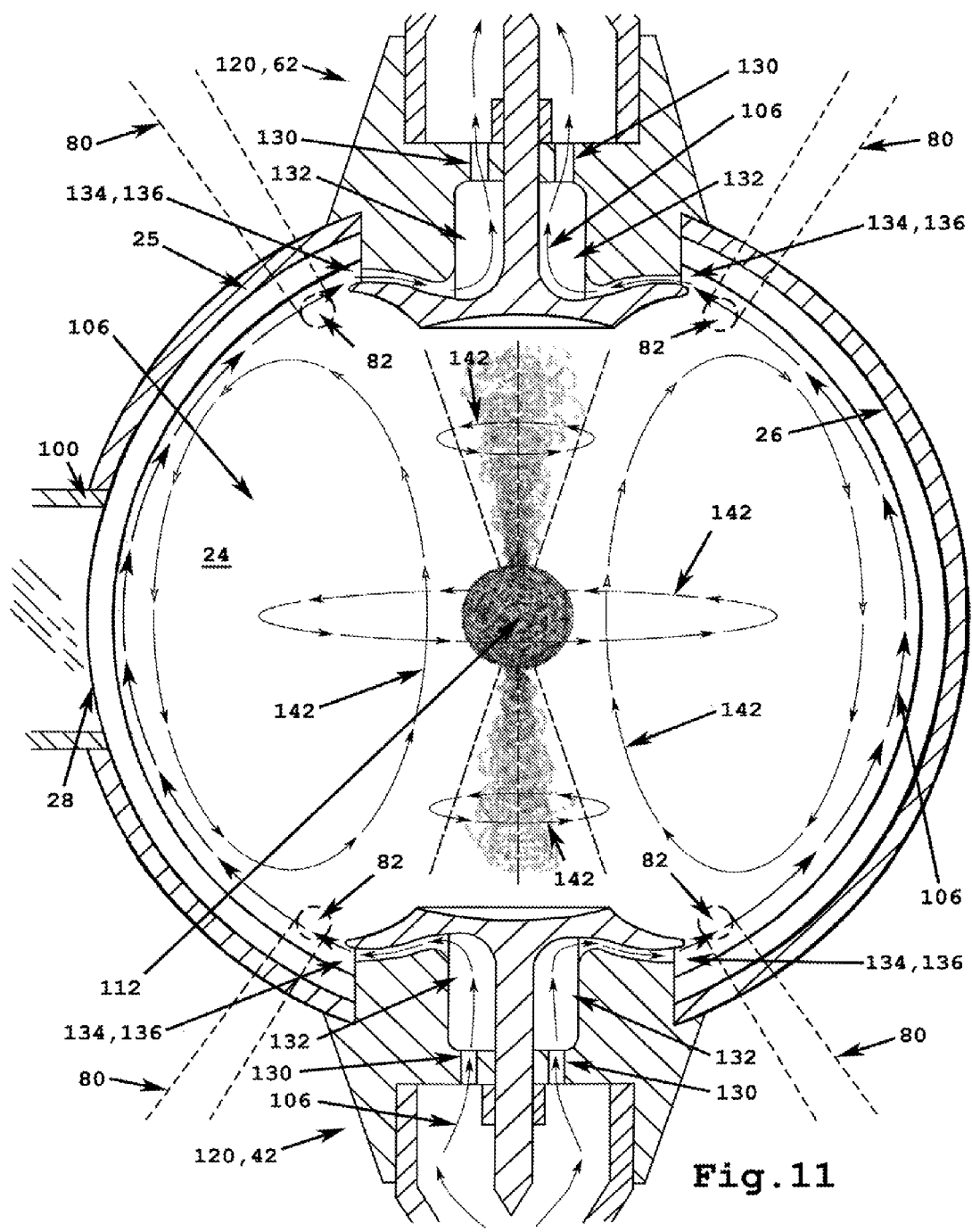
FIG. 11 is a cross sectional view of the THOUPA generator of FIG. 1.

In operation, as shown in FIG. 11, operation of spinner systems 120 during Bose Particle pumping and/or the fluid flow passing through the cavity 24 may create a spinning motion on fluid 106, and rotate fluid 112 within cavity 24 as shown in (FIGS. 7 and 8). Spinning motion of fluid 112 is illustrated by several arrows 142. Increased amplitude, heat and excitation fluid 112 may impart amplitude, heat and excitation to surrounding fluid 106 leaving through fluid spinner 62, and output conduit 50 to perform work. While the surrounding fluid 106 may not be as hot and excited as increased amplitude, heat and excitation fluid 112, surrounding fluid 106 may have lesser amplitude and expand to increase fluid pressure 114 (FIG. 12) generating force throughout the fluid system and output conduit 50, remaining hot enough to perform work and/or provide useful transfer heat for other systems.

As shown in FIG. 13, THOUPA generator 10 can be utilized with several systems to do work. As illustrated THOUPA generator 10 is coupled to high pressure output line 146 which is coupled to any of the following: variable flow restrictor, pressure gauge or monitor 148. Monitor 148 may be operably coupled to control 150 such as a remote system management and control system. High pressure output line 146 may also couple to a high pressure impeller/turbine 152 or a low pressure impeller/turbine 154 or both. Pressure impeller/turbines 152, 154, either individually, separate or together, may power electric generator 156 by any understood mechanism. Electric generator 156 may be used to supply energy to do work. Optionally, electric generator 156 may include an exciter 158 to power things such as remote system management and control system 150 and Bose Particle pumping device 144.

Pressure impeller/turbines 152, 154 may also couple to condenser 160 to further lower the amplitude, temperature of fluid 106. Condenser 160 may use cooling fluid pump 168 along cooling fluid line 170. Condenser 160 may return fluid 106 to pressurized reservoir 162. Pressurized reservoir 162 may provide fluid 106 to THOUPA generator 10 by use of feed pump/valve 164 and along low pressure inlet line 166. Further, in another embodiment, THOUPA generator 10 and high pressure output line 146 may be coupled to a steam generator and configure within similar configuration as conventional pressurized reactors. In the event that heated fluid used as fluid 106 would have the property of low volumetric thermal expansion coefficient, fluid 106 may transfer heat generated within THOUPA generator 10 to steam generator (not shown), when used as the primary heat generating source within similar configurations, the THOUPA generator 10 could thereby replace the reactor core and reactor vessel.

Figure 14:
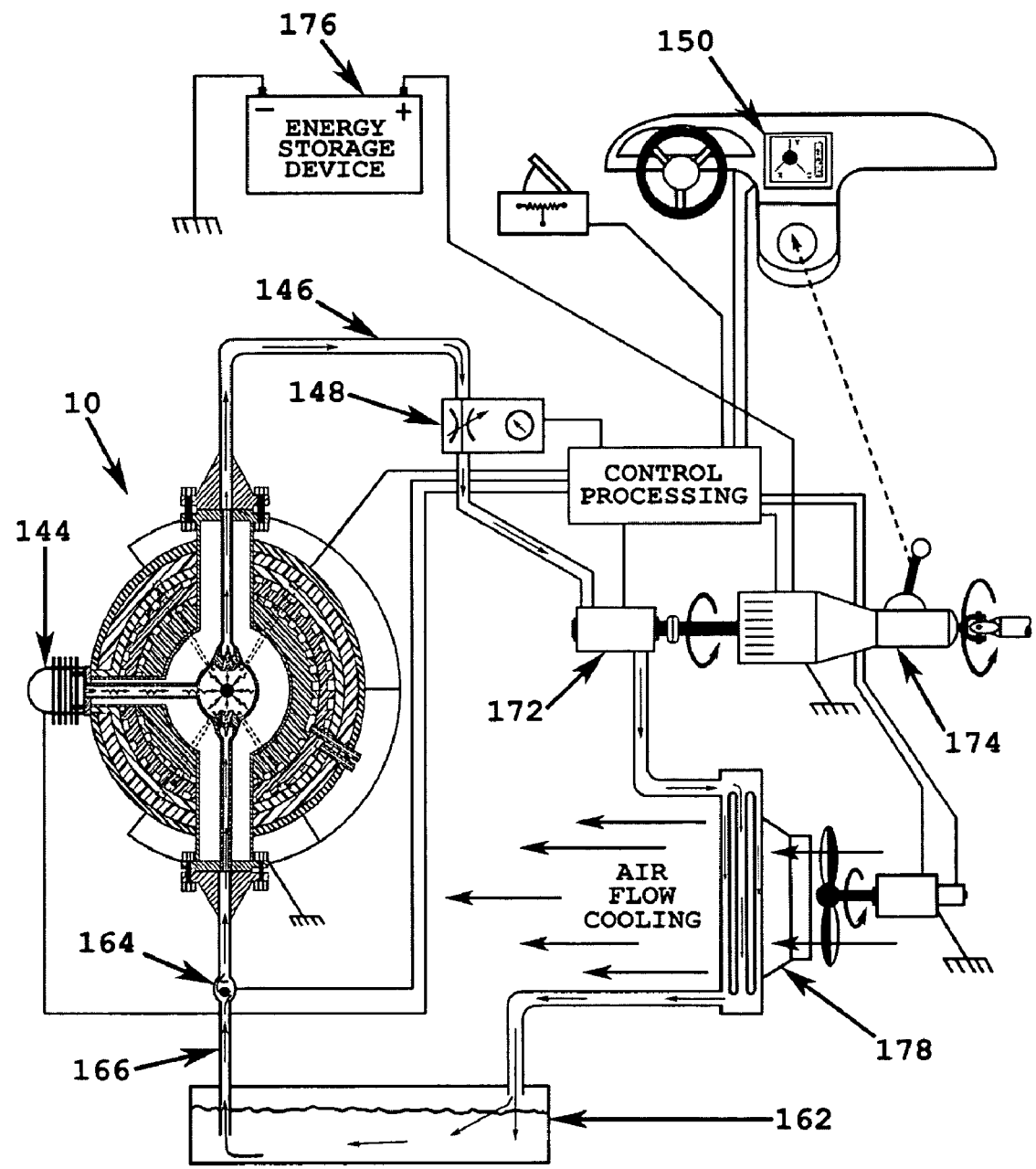
FIG. 14 is a cross sectional view of the THOUPA generator of FIG. 1 for use with a mobile system.

As shown in FIG. 14, THOUPA generator 10 is coupled to high pressure output line 146 which is coupled to an optional vane-type motor 172. Vane-type motor 172 may use fluid pressure to cause rotation to power an electric generator or alternator 174. Electric generator, alternator and/or transmission/drive line 174 could be used to charge an energy storage device 176, such as a battery, or Bose Particle pumping device 144. Optional vane-type motor 172 may be coupled to heat exchanger 178 to cool fluid 106.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A generator comprising:
    a spherical pressure container including a plurality of layers, the plurality of layers include at least one vacuum barrier layer, each of the plurality of layers defining a spherical shape, the pressure container defining a spherical cavity, the plurality of layers including at least one layer including a reflective medium or metallic coatings adjacent to the cavity, the cavity configured to hold a fluid;
    a fluid inlet coupled to the at least one layer, the fluid inlet in fluid communication with the cavity;
    a fluid outlet coupled to the at least one layer, the fluid outlet in fluid communication with the cavity; and
    at least one spinner system, the at least one spinner system including a spinner body and a spinner cap, the spinner body and the spinner cap at least partially located within the cavity, wherein the spinner body and the spinner cap are configured to impart a spinning motion on the fluid, wherein the spinner body and the spinner cap are each stationary, wherein the spinner cap defines a curved groove channel configured to impart the spinning motion on the fluid within the cavity, wherein the spinner body defines a spinner body passageway, the spinner body passageway in fluid communication with the curved groove channel;
    wherein the fluid is configured to absorb radiation in the cavity from a radiation source, the fluid outlet configured to release the fluid to perform work.

2. The generator of claim 1 wherein the plurality of layers are concentric.

3. The generator of claim 1 wherein the at least one layer is configured to withstand increased pressure from the fluid.

4. The generator of claim 1 further comprising an optical window, wherein the at least one layer defines at least one aperture, the optical window located within the at least one aperture.

5. The generator of claim 4 wherein the optical window is a reflective mirror.

6. The generator of claim 1 further comprising at least one observation tube at least partially located within the at least one layer, the at least one observation tube allows observation of the radiation within the cavity.

7. The generator of claim 6 wherein the at least one layer defines at least one aperture, wherein the observation tube includes at least one window located within at least one aperture.

8. The generator of claim 6 wherein the at least one window is a one-way mirror.

9. The generator of claim 1 further comprising at least one detector coupled to the at least one observation tube.

10. The generator of claim 1 wherein the radiation source includes a boson pumping system, wherein the at least one layer defines at least one aperture, the boson pumping system configured to provide at least one boson into the cavity through the at least one aperture.

11. The generator of claim 10 wherein the boson pumping system includes a boson pumping device.

12. The generator of claim 10 wherein the boson pumping system includes a boson passage coupling the boson pumping device to the at least one aperture.

13. The generator of claim 1 wherein the at least one layer includes a layer of glass or boson transparent material.

14. The generator of claim 1 wherein the at least one layer includes at least one fiber.

15. The generator of claim 14 wherein the fiber is man made.

16. A method of providing work comprising the steps of:
    a. introducing water into a spherical cavity, wherein at least one layer defines the cavity, the at least one layer configured to withstand greater than atmospheric pressure, the at least one layer including a reflective medium, or coatings, concentric to the interior surface of the at least one layer, wherein the at least one layer includes at least one observation tube which allows for observation into the cavity,
    b. imparting a spinning motion on the water introduced in the spherical cavity with at least one spinner system including a spinner body and a spinner cap, the spinner body and the spinner cap at least partially located within the cavity, wherein the spinner body and the spinner cap are each stationary, wherein the spinner cap defines a curved groove channel configured to impart the spinning motion on the water within the cavity, wherein the spinner body defines a spinner body passageway, the spinner body passageway in fluid communication with the curved groove channel, c. directing radiation into the cavity, the radiation absorbable by the water, and d. releasing the radiated water to do work.

17. The generator comprising:

a spherical pressure container including a plurality of layers, the plurality of layers include at least one vacuum barrier layer, wherein the plurality of layers are concentric, each of the plurality of layers defining a spherical shape, the pressure container defining a spherical cavity, the plurality of layers including at least one layer including a reflective medium, or coatings adjacent to the cavity, the cavity configured to hold water, the at least one layer defining at least one aperture, a boson pumping system coupled to the at least one layer, the boson pumping system including a boson pumping device, the boson pumping system including a boson passage configured to operably couple radiation from the boson pumping device to the cavity, at least one observation tube adjacent to the at least one aperture, the at least one observation tube allows for detection of the radiation in the cavity, the at least one observation tube coupled to a detector for detecting or monitoring radiation within the cavity, at least one spinner system, the at least one spinner system including a spinner body and a spinner cap, the spinner body and the spinner cap at least partially located within the cavity, wherein the spinner body and the spinner cap are configured to impart a spinning motion on the water, wherein the spinner body and the spinner cap are each stationary, wherein the spinner cap defines a curved groove channel configured to impart the spinning motion on the water within the cavity, wherein the spinner body defines a spinner body passageway, the spinner body passageway in fluid communication with the curved groove channel, a fluid inlet coupled to the at least one layer, the fluid inlet in fluid communication with the cavity, and a fluid outlet coupled to the at least one layer, the fluid outlet in fluid communication with the cavity, the water configured to absorb radiation in the cavity, the fluid outlet configured to release the water to perform work.

18. The generator of claim 1 wherein the spinner cap defines a curved groove channel configured to impart the spinning motion on the fluid within the cavity.

19. The generator of claim 18 wherein the spinner body defines a spinner body passageway, the spinner body passageway in fluid communication with the curved groove channel.

* * * * *